Oct. 14, 1958 — A. FEDER — 2,855,825
REARVIEW MIRROR
Filed Sept. 20, 1957 — 2 Sheets-Sheet 1
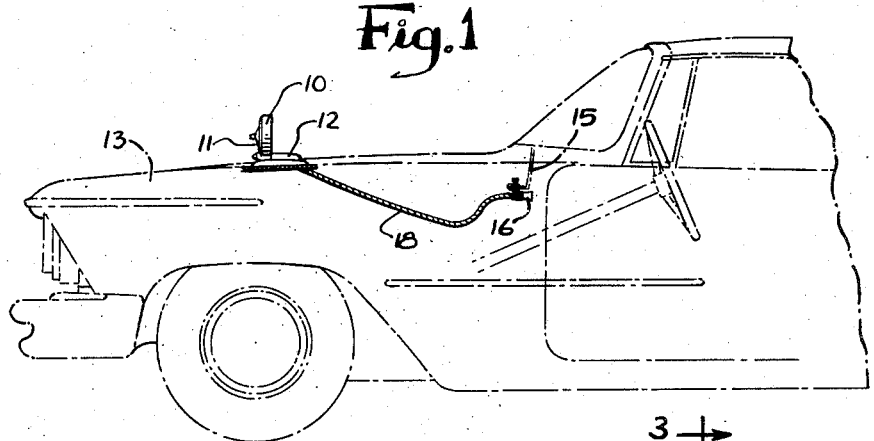
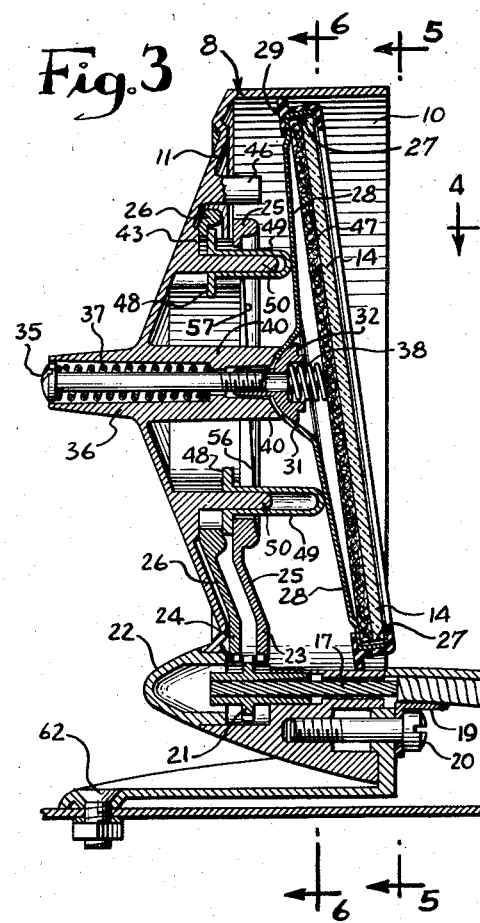
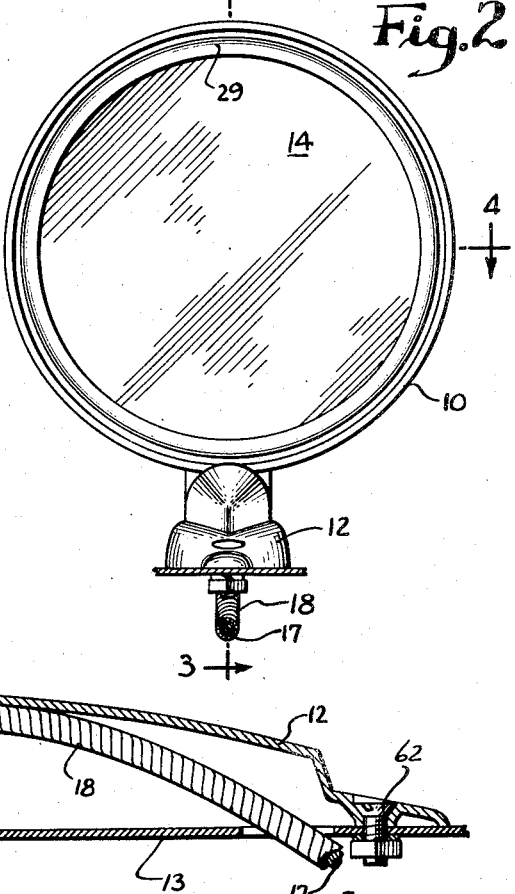
INVENTOR
ALVIN FEDER
by: Gary, Desmond & Parker
ATTYS.

Oct. 14, 1958 — A. FEDER — 2,855,825
REARVIEW MIRROR
Filed Sept. 20, 1957 — 2 Sheets-Sheet 2

INVENTOR
ALVIN FEDER
by: Gary, Desmond & Parker
ATTYS.

United States Patent Office 2,855,825
Patented Oct. 14, 1958

2,855,825
REARVIEW MIRROR

Alvin Feder, Chicago, Ill., assignor to Alted Corporation, Chicago, Ill., a corporation of Illinois Application September 20, 1957, Serial No. 685,267

5 Claims. (Cl. 88—93)

This invention relates to rearview mirrors for motor vehicles such as land, water and aircraft, and particularly to a rearview mirror adapted to be mounted on the exterior of the vehicle, such as on a fender or other body portion.

It is a particular object of the present invention to provide novel remote control means whereby an exteriorly mounted rearview mirror can be tiltably adjusted for optimum utility from within the vehicle.

Other objects and advantages relate to the details of construction, arrangement of parts and the economies thereof which will be apparent from a consideration of the following specification and accompanying drawings, wherein:

Fig. 1 is a side elevational view of the rearview mirror of the present invention mounted in operative position on a front fender of an automobile.

Fig. 2 is a front elevational view of my rearview mirror.

Fig. 3 is a section on the line 3—3 of Fig. 2.

Figure 4:
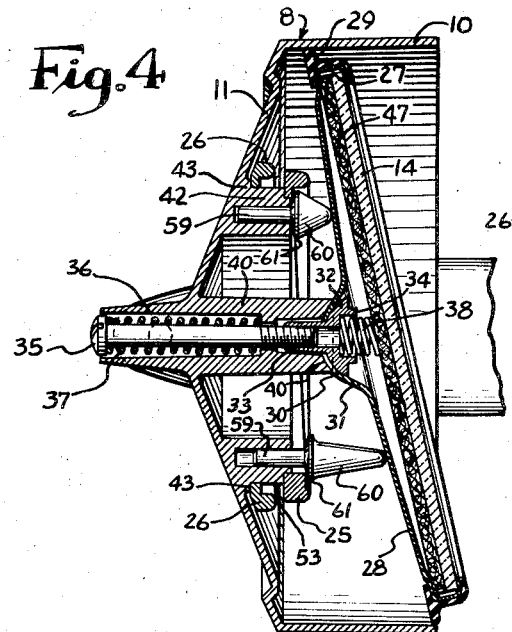
Fig. 4 is a section on the line 4—4 of Fig. 2.

Referring to the drawings, my remote controllable rearview mirror comprises a housing 8 defined by a cylindrical portion or hood 10 closed at one end by the wall member 11, pivotally engaged to the base member 12 for mounting the unit on, for example, a front fender 13 of an automobile. The mirror 14 disposed in the cylindrical housing portion 10 is remote controllable from, for example, the dashboard 15 of the automobile by means of the knob 16 thereon secured to one end of cable 17 (enclosed in flexible housing 18).

The opposed end of cable 17 extends through fender 13 and into the base 12 where the housing 18 is fixedly secured as by means of spot welding to the angle bracket 19 carried by the bolt 20. The projecting terminal end of cable 17 is secured to the pinion gear 21 disposed in the pinion gear housing 22 carried by mirror housing portion 10, the pinion gear projecting through a slot in the housing portion 10 for meshing engagement with the quadrant gears 23 and 24 on the cam rings 25 and 26, respectively, and alternately engageable with said gears by reciprocation of the cable 17 in its housing 18 by means of knob 16, to the ends hereinafter described.

The circular mirror 14 backed by the felt 47 is peripherally embraced by the flange 27 of the holder 28, and if desired an additional peripheral sealing gasket 29 of resilient material, such as rubber, may be employed. The holder 28 is formed with an axially concentric aperture 30 and spherical surfaced boss 31 seating the hemispherical button 32, the latter having an integral internally threaded leg 33 extending through the aperture 30. The boss 31 is provided rearwardly with a seat 34 positioning the compression spring 38 for initial assembly purposes, prior to the time when the leg 33 is engaged to the bolt 35 resiliently disposed in the housing well 36 by the compression spring 37.

Upon engagement of the bolt 35 to the leg 33 of hemispherical button 32, the spherical boss portion 31 becomes resiliently urged against the complementary spherical surfaced seat 39 on the inner end of boss 40. Although the outer contour of leg 33 is rectangular and receivable in the complementary angular recess 41 against relative rotation, the mirror in its holder 28 is tiltable on the ball and socket joint components formed by the boss 31 and seat 39 held in resilient engagement by means of spring 37. By such arrangement, and absent the control means to be described, the mirror 14 might be tilted by hand to desired inclination in a substantially universal manner.

The present invention provides simple, inexpensive remote control means of a fully mechanical nature and positive in action whereby tilting by remote control is effected on substantially vertical and horizontal axes, or upwardly and downwardly and to the right or left.

Figures 7, 8:
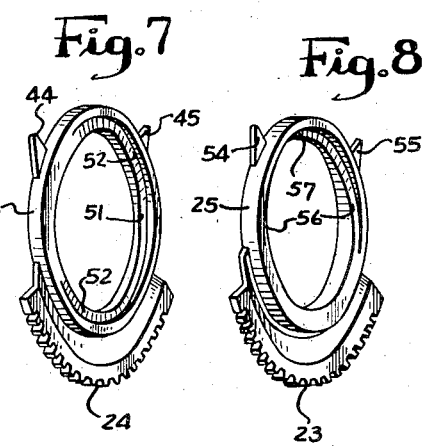
Fig. 7 is a perspective view of the cam and gear ring of Fig. 6.
Fig. 8 is a perspective view of the upper one of the cam and gear rings shown in Fig. 5.
Figure 5:
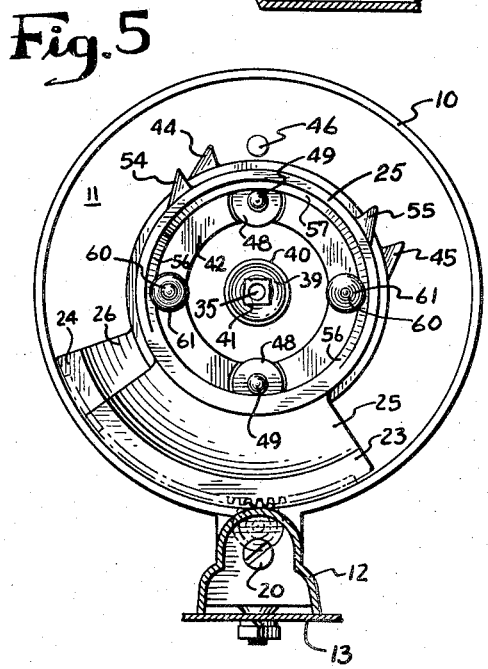
Fig. 5 is a view similar to that of Fig. 2, but with the mirror removed from the assembly housing, and the supporting base in section, illustrating the actuating gears and cams.
Figure 6:
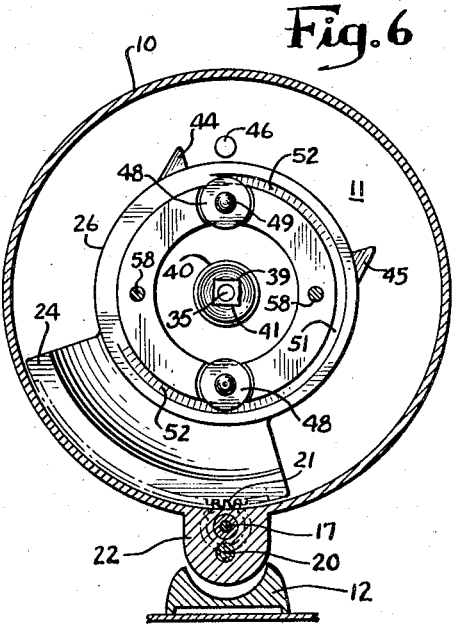
Fig. 6 is a view similar to that of Fig. 5 but with the upper cam and gear ring removed.

For this purpose I provide the rings 25 and 26 each carrying a gear segment and a cam surface. The inner ring 26 rotatably embraces the collar 42 and rests on a shoulder 43 thereof, and is rotatable thereon by meshing engagement of the pinion 21 with the gear segment 24, to the limits of the lugs 44 and 45 against the stop 46. The collar 42 is of segmental nature so that diametrically opposed recesses are provided to freely receive the circular flanges 48 of the hollow pins 49, 49 reciprocally disposed on the guide studs 50, 50. The upper face of ring 26 is inscribed to provide it with a cam surface, so that as seen in Fig. 7, there is a low area 51 at one side and two high areas 52, 52, one at the top and the other at the bottom. The diameter of the flanges 48 is such that they project onto and ride on the aforesaid cam surface or track.

As will be seen from Fig. 3, the pins 49, 49 project to the mirror holder 28, and by rotating the ring 26 through the described gear means, the high and low areas 51 and 52 of the cam face against which the flanges 48 of the pins 49 bear, one pin 49 becomes elevated and the other relatively depressed to thereby tilt the mirror 14, in this case substantially about a horizontal axis, or upwardly or downwardly. One of the pins 49 may be longer than the other to provide an initial upward tilt, since greater upward tiltability in operation is desired, and lesser in a downward direction. This arrangement also permits employment of a smaller gear segment 24.

The upper ring 25 provides tiltability in substantially the same manner by similar means, substantially about a vertical axis or from right to left. Thus, the ring 25 is of such a diameter that it seats freely on the shoulder 53 of collar 42 and is rotatable thereabout to the limits of its lugs 54, 55 against stop 46 upon meshing engagement of its gear segment 23 by pinion gear 21. The ring 25 is likewise inscribed with a cam surface area having two high points 56, 56 converging to a low point 57. The collar 43 is provided with a diametrically opposed pair of holes 58, 58 spaced respectively 90° from the guide studs 50, 50, the holes 58, 58 freely receiving the lower ends 59 of the pins 60, 60 to the limit of their flanges 61 and thus the mirror 14 may be tilted, as viewed from right to left.

As appears from Fig. 4, one of the pins 60 is longer than the other, these pins being interchangeable, and provide initial right and left side mountable units. That is to say, these unequal length pins provide an initial or pre-set tilt and further tilting by means of the gear and cam assembly is from said inclination. This has been found desirable since rearview mirrors mounted on the left side of a vehicle are ordinarily inclined to the right in use, and vice versa.

The assembly as a whole can be mounted on, for example, the fender of a car, by means of bolts 62 extending through the base component 12, and if mounted elsewhere, or if desired for any other reason, the housing 10, 11 may be angularly disposed to the base 12, on assembly by means of the bolt 20 which connects the two parts, providing further initial flexibility.

It will be apparent that the mirror 14 may be alternately tilted, within the limits of the gear segments 23 and 24, about two axes at right angles to each other. Thus, for example, by engagement of the pinion 21 with gear 23, and rotation of the pinion, the mirror is caused to pivot and tilt about the pins or fingers 49, 49 which bear against the mirror back 28, by the raising and lowering movement of the pins or fingers 60, 60; and similarly by engagement of the pinion 21 with gear 24, the mirror 14 may be caused to pivot and tilt about the pins or fingers 60, 60, which bear against the mirror back 28, by the raising and lowering of the pins or fingers 49, 49.

Although I have shown and described the preferred form of my device, it will be understood by those skilled in the art that modifications may be made in the details thereof without departing from the spirit of my invention as set forth in the following claims.

I claim:

1. A remote controllable rearview mirror for automotive vehicles comprising a housing, a holder in embracing engagement with a mirror including a backing portion and formed with an axial spherical boss disposed in said housing, a socketed support in said housing seating said boss and means extending therebetween retaining them in relatively yieldable tiltable engagement, an axially spaced pair of rings concentrically mounted in said housing for rotation about the axis of said support, each ring formed with cam surface areas, separate pairs of diametrically opposed equi-angularly spaced flanged pins disposed in said housing for alternate reciprocation by said cam surfaces parallel to the axis of said support, said pins terminally bearing on said mirror frame backing portion, each of said rings including an integral peripherally extending gear segment normally substantially coinciding with each other, and a rotatably and slidably mounted flexible shaft carrying a pinion extending into said housing alternately engageable with said gear segments for rotating the latter and thereby selectively actuating their respectively associated cam and pin means and for tilting the mirror about said respective pin pairs as pivots.

2. A remote controllable rearview mirror for automotive vehicles comprising a base member adapted to be mounted on a vehicle exterior portion, a housing supported on and in pivotal engagement with said base member, a mirror disposed in said housing, a holder in embracing engagement with said mirror including a backing portion and formed with an axially apertured spherical boss, a complementary spherical surfaced button disposed within said boss and projecting through said aperture, a socketed support on said housing seating said boss and projecting button portion, spring means in said support in engagement with said button retaining said mirror assembly in yieldable tiltable engagement, a spaced concentric pair of rings seated on shoulders in said housing for rotation about the axis of said support each formed with similar cam surface areas angularly spaced from each other and each including a peripherally extending gear segment substantially overlying each other, two pairs of diametrically opposed equi-angularly spaced pins disposed in said housing for reciprocation parallel to the axis of said support and each terminally bearing on said mirror frame backing portion, peripheral flanges on said pins adjacent their opposed ends seated on said cam surface areas and adapted to be alternately reciprocated with their associated pins on rotation of said rings to thereby tilt said mirror, and a rotatably and slidably mounted flexible shaft extending through said mounting bracket and carrying thereat a pinion extending into said housing alternately engageable with said gear segments for rotating the latter and thereby selectively actuating their respectively associated cam and pin means and for alternately tilting the mirror about one of said respective pin pairs as pivots.

3. A remote controllable rearview mirror for automotive vehicles comprising a housing, a mirror disposed in said housing, a holder in embracing engagement with said mirror including a backing portion formed with an axially apertured spherical boss, a socketed support in said housing seating said boss, spring means in said support in engagement with means disposed in said boss retaining said mirror assembly in tiltable engagement, a first ring concentrically mounted in said housing for rotation about the axis of said support formed with cam surface areas and including a peripherally extending gear segment, a second ring concentrically mounted in said housing for rotation about the axis of said support formed with cam surface areas normally angularly spaced relative to the cam surfaces on the first ring and including a peripherally extending gear segment normally substantially coinciding with the gear segment on the first ring, pairs of diametrically opposed peripherally flanged pins disposed in said housing for alternate reciprocation parallel to the axis of said support by the cam surfaces of each of said rings, each of said pins terminally bearing on said mirror frame backing portion in a pair of planes extending through the axis of the support and at right angles to each other, and adapted to thereby tilt said mirror on rotation of said rings in planes substantially normal to each other, and a rotatably and slidably mounted flexible shaft carrying a pinion extending into said housing alternately engageable with one of each of said gear segments for rotating the latter and to thereby selectively actuate their respectively associated cam and pin means and for tilting the mirror about said respective pin pairs as pivots.

4. The device of claim 3 wherein one pin of each pair is longer than the other to thereby normally dispose the mirror tilted upwardly and sidewise.

5. A remote controllable rearview mirror for automotive vehicles comprising a base member adapted to be mounted on a vehicle exterior portion, a housing supported on and in pivotal engagement with said base member, a mirror disposed in said housing, a frame in embracing engagement with said mirror including a backing portion formed with an axially apertured spherical boss, a complementary spherical surfaced button disposed within said boss and projecting through said aperture, a socketed support in said housing seating said boss and projecting button portion, spring means in said support in engagement with said button retaining said mirror assembly in yieldable tiltable engagement, a first ring concentrically mounted in said housing for rotation about the axis of said support and formed with cam surface areas and including a peripherally extending gear segment, a pair of diametrically opposed pins disposed in said housing for reciprocation parallel to the axis of said support and terminally bearing on said mirror frame backing portion, peripheral flanges on said pins adjacent their opposed ends seated on said cam surface areas and adapted to be alternately reciprocated with their associated pins upon rotation of said ring to thereby tilt said mirror about a second pair of angularly spaced pins as pivots, a second ring concentrically mounted in said housing for rotation about the axis of said support formed with cam surface areas normally angularly spaced relative to the cam surfaces on the first ring and including a peripherally extending gear segment normally substantially coinciding with the gear segment on the first ring, a second pair of diametrically opposed peripherally flanged pins disposed in said housing for alternate reciprocation parallel to the axis of said support by the cam surfaces on said second ring, said second pin pair terminally bearing on said mirror frame backing portion in a plane extending through the axis of the support at a right angle to a similar plane extending through the first pin pair and said axis, and adapted to thereby tilt said mirror on rotation of said second ring in a plane substantially normal to the former about the ends of the first pins as pivots, and a rotatably and slidably mounted flexible shaft extending through said mounting bracket and carrying thereat a pinion extending into said housing alternately engageable with said gear segments for rotating the latter and to thereby selectively actuate their respectively associated cam and pin means and for tilting the mirror about said respective pin pairs as pivots.

References Cited in the file of this patent

UNITED STATES PATENTS

| | | |
|---|---|---|
| 2,066,982 | Kronquist | Jan. 5, 1937 |
| 2,326,316 | Allen | Aug. 10, 1943 |
| 2,456,362 | Aves | Dec. 14, 1948 |
| 2,614,437 | Meggitt | Oct. 21, 1952 |
| 2,629,286 | Budreck | Feb. 24, 1953 |
| 2,656,764 | Johnson | Oct. 27, 1953 |
| 2,664,029 | Higgins | Dec. 29, 1953 |
| 2,696,142 | Langford | Dec. 7, 1954 |
| 2,752,823 | Martin et al. | July 3, 1956 |
| 2,791,939 | Malachowski | May 14, 1957 |
| 2,805,600 | Miller | Sept. 10, 1957 |